Oct. 7, 1958  A. GALBRAITH  2,854,914
VENTILATING DEVICES ESPECIALLY FOR VEHICLES
Filed Oct. 30, 1956  3 Sheets-Sheet 1
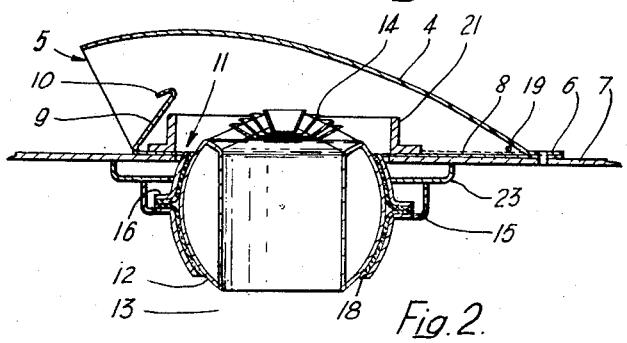
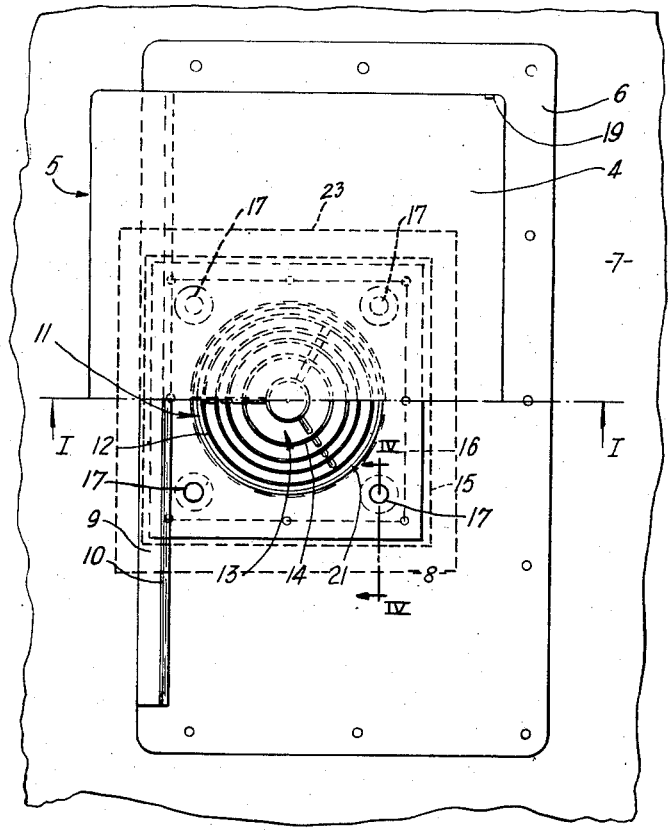
Inventor
Alexander Galbraith
By Lancaster Allwine & Rommel
Attorneys

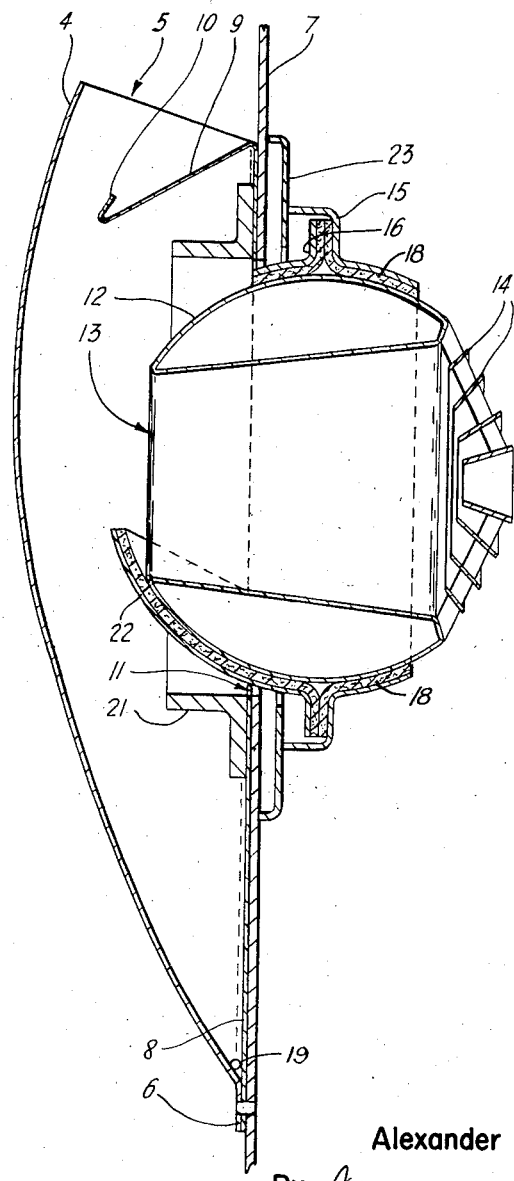

Oct. 7, 1958
A. GALBRAITH
2,854,914
VENTILATING DEVICES ESPECIALLY FOR VEHICLES
Filed Oct. 30, 1956
3 Sheets-Sheet 3
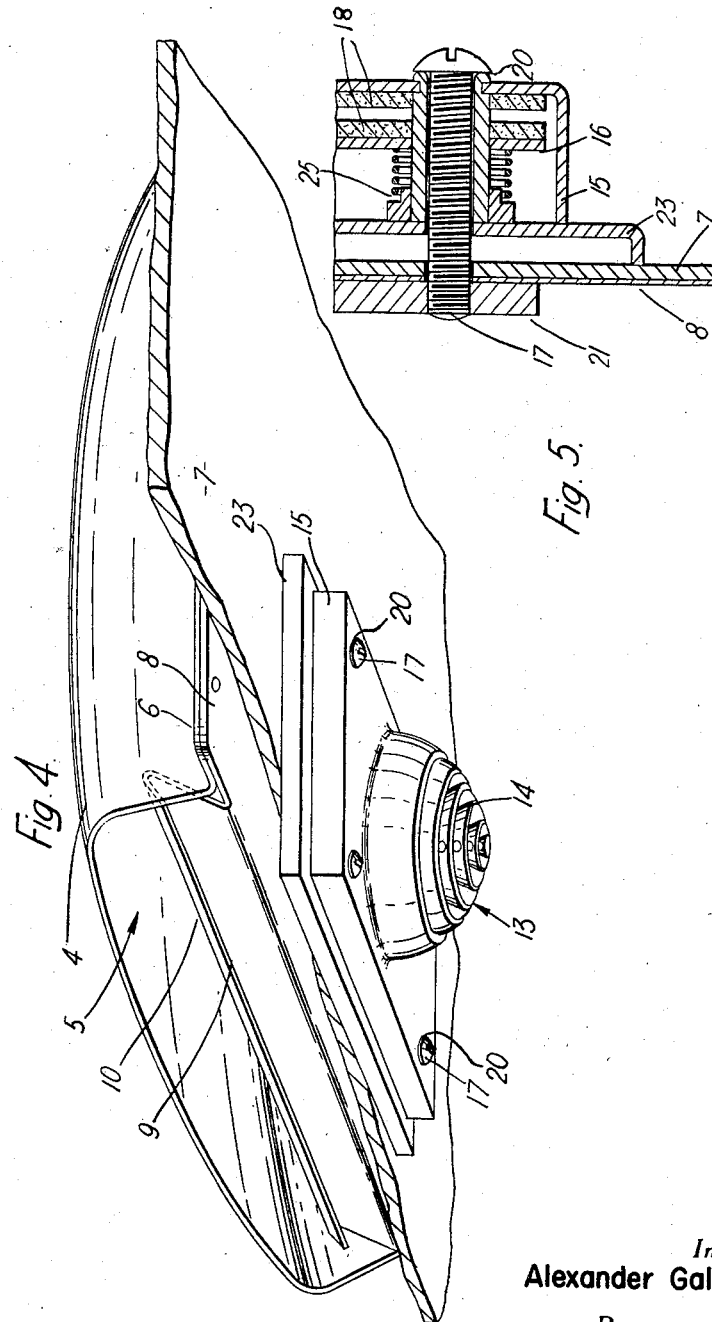
Inventor
Alexander Galbraith
By
Rommel, Allwine & Rommel Attorneys

United States Patent Office 2,854,914
Patented Oct. 7, 1958

2,854,914

VENTILATING DEVICES ESPECIALLY FOR VEHICLES

Alexander Galbraith, Glasgow, Scotland, assignor of one-half to John Cleiff, Larkhall, England Application October 30, 1956, Serial No. 619,172

2 Claims. (Cl. 98—13)

This invention relates to ventilating devices and is especially suitable for road transport vehicles such as trucks, omnibuses or automobiles.

In such vehicles the driver and occupants often have to travel a considerable distance, either in daylight or in darkness, or in cold or hot weather.

An object of the present invention is to provide a ventilating device which will be advantageous for use under the stated conditions.

According to the present invention I provide a ventilating device comprising on the exterior side an air scoop, and on the interior side a ventilation louver adapted to provide in one position a relatively high speed blow or jet of air and in another position a relatively low speed diffused stream of air. The louvre is preferably adjustable directionally.

The louvre may advantageously be of the kind described in patent specification No. 2,755,729 and thus be directionally adjustable, and provided with means resiliently urging the component parts together, for resisting creep or relative movement between the parts as the result of vibration during use.

An embodiment of the invention will now be described, by way of example, with reference to the accompanying drawings, wherein:

Fig. 1 is a sectional elevation of the device on the center line I—I of Fig. 2;

Fig. 2 is a plan view of the device with half of the scoop removed;

Fig. 3 is a sectional elevation of a modified device which is provided with a shut-off means for the airflow;

Fig. 4 is a perspective view of the device as mounted on a vehicle cabin roof; and Fig. 5 is an enlarged sectional view on the line IV—IV of Fig. 2.

Referring now to the drawings, the invention comprises an outer scoop or cowl 4 which is positioned on the top surface 7 of a vehicle cabin roof and has its open mouth 5 facing forward.

The scoop is secured to the roof by a flange 6 formed around both sides and the rear end of the scoop, and after initially rising its height is gradually reduced towards the trailing end to give a streamlined effect. The base of the scoop is formed from a plate 8 which is secured together with the scoop flanges 6 to the roof. The leading edge of the base-plate 8 has an upwardly and rearwardly inclined flanged part forming a deflector 9, the upper edge of which is bent forwardly and downwardly as indicated at 10.

The base plate 8 is formed with a through-aperture 11 positioned co-axially with a similar aperture in the cabin room and provides a mounting for a ball and socket louver device of generally known construction. The louver comprises an interior ball 12 with a cylindrical through passage centrally positioned therein, open at one end 13 and at the other end provided with a diffuser arrangement 14 in the form of concentric conical vanes. Orientation of the ball relative to the socket is effected manually. By reversing the position of the ball a direct blow or a diffused supply of air can be obtained; while by swivelling the ball the air jet may be directed as required.

The ball is universally adjustable as above within a complementary socket comprising two opposed flanges 15 and 16, each having a part-spherical rim and together forming a part spherical socket for the ball. The two flanges are spring urged together by four springs 25 located on four bolts 17 which pass through the holes 20 around their periphery, and the inner faces of the part spherical parts are covered with felt 18, and in this way these parts always snugly grip the ball, and yet allow it to be positioned by hand.

If, as is normal, wear occurs between the ball and the socket during use as a result of vibration, the springs maintain pressure between the parts, and thus compensate for wear. Thus the louver may be set in any desired position and will normally remain in this position until readjusted in spite of vibration. A fuller description of this louver is given in Patent Specification No. 2,755,729. As shown in Fig. 5, the complete louver is attached to the base-plate 8 together with the intermediate spacing member 23, by four bolts 17 which pass through holes 20 in each corner of the flanged parts 15 and 16, and screw into tapped holes in an upstanding flange 21. The springs 25 urge the flanged parts 15 and 16 together.

At the inner part of the base-plate the upstanding ring-like flange 21 is provided around the circular aperture in the base plate of the louver, so that if rain or condensation collects on the base-plate in spite of the deflector plate 9 it will be prevented from entering through the louver or its mounting. Drainage holes 19 are provided at both sides of the trailing end to allow any collected water to drain away.

In a modification (Fig. 3) the device is as described above save that it is fitted with an air jet shut-off means, which comprises a part spherical extension or lip 22 formed on the flange 16 and is of sufficient size to cover the openings 13 or 14 when the louver ball is turned into the "shut" position.

In a further modification the spacing member 23 may be replaced, simply by extending the flange 15 to abut the lower surface of the cabin roof.

While it is the preferred embodiment of the air diffuser which is shown and described, it will be manifest that the invention is not to be restricted only to this construction, and it may also be mounted on the sides of the vehicles, or on aircraft.

I claim:

1. In a vehicle having in its roof an aperture providing intercommunication between the vehicle interior and atmosphere, means for controlling ventilation of the interior through said aperture comprising a louvre filling said aperture transversely and comprising a socket-forming part-spherical casing disposed immediately below said aperture in coaxial relationship therewith, a continuous flange skirting said socket normal to the axis thereof, means securing said flange to the inside of the roof about said aperture, an adjustable hollow spherical air director ball mounted within said casing for swivelling movement into at least two positions, in one of which it passes incoming air in the form of a jet and in the other of which it passes incoming air in the form of a diffused airstream, and resilient means urging the socket into close contact with said ball thereby to reduce relative creep between the two on the occurrence of vibration, a scoop mounted in the inverted position on said roof and over said aperture with the mouth of the scoop leading in the direction of forward propulsion of the vehicle, an outwardly-turned flange extending around both sides and the rear of said scoop, a plate disposed between said scoop and said roof and having therein an aperture coinciding with the roof aperture, means extending through said flange and said plate securing both the scoop and the plate to said roof, an upwardly- and rearwardly- inclined flange at the leading end of said plate and bridging between the sides of said scoop but leaving clear a space between the flange upper edge and the base of said scoop thereabove, and a lip on the upper edge of said flange reversely turned away from the scoop interior.

2. A vehicle as claimed in claim 1, including a continuous upstanding flange skirting said aperture in the plate to prevent inflow through the two apertures of water which passes the flange and collects in the enclosure bounded by the plate and the scoop, said scoop having openings at its trailing end for draining such water to the exterior of the scoop.

References Cited in the file of this patent

UNITED STATES PATENTS

| | | |
|---|---|---|
| 1,569,667 | Neilson | Jan. 12, 1926 |
| 2,232,108 | Giacomini | Feb. 18, 1941 |
| 2,550,353 | Hopfinger | July 16, 1949 |
| 2,755,729 | Galbraith et al. | July 24, 1956 |
| 2,756,664 | McCuen | July 31, 1956 |
| 2,758,533 | Hill et al. | Aug. 14, 1956 |

FOREIGN PATENTS

| | | |
|---|---|---|
| 576,859 | Great Britain | Apr. 24, 1946 |